United States Patent
Suter et al.

(10) Patent No.: US 11,200,291 B2
(45) Date of Patent: *Dec. 14, 2021

(54) AUTOMATED GENERATION OF WEB API DESCRIPTIONS FROM USAGE DATA

(71) Applicant: International Business Machines Corporation, Armonk, NY (US)

(72) Inventors: Philippe Suter, New York, NY (US); John E. Wittern, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 549 days.

This patent is subject to a terminal disclaimer.

(21) Appl. No.: 14/929,944

(22) Filed: Nov. 2, 2015

(65) Prior Publication Data
US 2017/0124210 A1 May 4, 2017

(51) Int. Cl.
G06F 16/955 (2019.01)
G06F 40/205 (2020.01)
G06N 20/20 (2019.01)
G06N 5/00 (2006.01)
G06F 16/245 (2019.01)
G06N 20/00 (2019.01)
H04L 29/08 (2006.01)

(52) U.S. Cl.
CPC ........ *G06F 16/9566* (2019.01); *G06F 16/245* (2019.01); *G06F 40/205* (2020.01); *G06N 5/003* (2013.01); *G06N 20/00* (2019.01); *G06N 20/20* (2019.01); *H04L 67/02* (2013.01)

(58) Field of Classification Search
CPC .. G06F 16/9566; G06F 16/245; G06F 40/205; G06N 20/20; G06N 20/00; G06N 5/003; H04L 67/02
USPC ....................................................... 707/770
See application file for complete search history.

(56) References Cited

U.S. PATENT DOCUMENTS 7,383,274 B2  6/2008  Pearce et al.
7,747,610 B2  6/2010  Chinchwadkar et al.
(Continued)

OTHER PUBLICATIONS

Steiner, Thomas. Automatic multi language program library generation for rest apis. Diss. Master's thesis, University of Karlsruhe/cole Nationale Suprieure d'Informatique et de Mathmatiques Appliques de Grenoble, 2007.*
(Continued)

*Primary Examiner* — Mohsen Almani
(74) *Attorney, Agent, or Firm* — Cantor Colburn LLP; Stosch Sabo

(57) ABSTRACT

A computer-implemented method for creating a web programming interface (API) description may include parsing an API usage dataset with a processor to identify a plurality of nodes in each of a plurality of uniform resource locators (URLs), and tagging path parameters for the plurality of nodes. Tagging the path parameters may include identifying, with the processor, which nodes are static parts of the URLs, and identifying, with the processor, which of the nodes are path parameters for the URLs. The method may further include aggregating, with the processor, a plurality of node types based on the tagged path parameters and the static parts of the URLs, and outputting, via the processor, an API description based on the aggregated plurality of node types.

14 Claims, 5 Drawing Sheets

(56) References Cited

U.S. PATENT DOCUMENTS

| | | | |
|---|---|---|---|
| 8,355,997 B2 | 1/2013 | Kirshenbaum | |
| 8,510,762 B1 | 8/2013 | Gregorio | |
| 8,756,685 B2 * | 6/2014 | Jeong | G06F 21/563 726/22 |
| 9,191,285 B1 * | 11/2015 | Isaacson | H04L 41/5009 |
| 2012/0047180 A1 * | 2/2012 | Kirshenbaum | G06F 17/30887 707/797 |
| 2012/0296929 A1 | 11/2012 | Hossain | |
| 2014/0366011 A1 | 12/2014 | Rector | |
| 2015/0128156 A1 | 5/2015 | Zhu | |
| 2015/0188818 A1 | 7/2015 | Alkhatib et al. | |
| 2015/0227598 A1 | 8/2015 | Hahn | |
| 2016/0019102 A1 | 1/2016 | Cui | |
| 2016/0255107 A1 * | 9/2016 | Qian | H04L 63/1425 726/23 |
| 2017/0102925 A1 | 4/2017 | Ali | |

OTHER PUBLICATIONS

Bieg, Mauro. A Web-based Tool to Semi-automatically Import Data from Generic REST APIs. MS thesis. ETH-Zürich, 2014. (Year: 2014).*

Dagenais, B., et al., "Recovering Traceability Links between an API and its Learning Resources," Proceedings of the 34th International Conference on Software Engineering (ICSE), Jun. 2012, 11 pages.

Danielson, Peter J., "Validation and Interactivity of Web API Documentation," Proceedings of 20th IEEE International Conference on Web Services (ICWS), Jun. 2013, pp. 523-530; 8 pages.

List of IBM Patents or Patent Applications Treated as Related; (Appendix P), Filed Apr. 15, 2016; 2 pages.

Philippe Suter et al., "Automated Generation of Web API Descriptions From Usage Data", U.S. Appl. No. 14/964,825, filed Dec. 10, 2015.

Suter, Philippe et al., "Inferring Web API Descriptions From Usage Data," 2015 Third IEEE Workshop on Hot Topics in Web Systems and Technologies; 978-1-4673-9688-2/15; 6 pages.

* cited by examiner

```
 1  {
 2    "info": {
 3      "version": "0.1",
 4      "title": "Twitter.com API"
 5    },
 6    "paths": {
 7      "": {
 8        "GET": {
 9          "description": "Autogenerated description",
10          "parameters": [
11            {
12              "description": "Autogenerated description. Example values are: eriktwittern, pautor..",
13              "type": "string",
14              "name": "name",
15              "in": "query"
16            },
17            {
18              "description": "Autogenerated description. Example values are: asc, desc..",
19              "type": "string",
20              "name": "order",
21              "in": "query"
22            }
23          ],
24          "summary": "GET "
25        }
26      }
27    },
28    "schemes": [
29      "http"
30    ],
31    "basePath": "/users",
32    "host": "api.twitter.com",
33    "swagger": "2.0"
34  }
```

FIG. 5

AUTOMATED GENERATION OF WEB API DESCRIPTIONS FROM USAGE DATA

BACKGROUND

The present disclosure relates to generation of web application program interface (API) descriptions, and more specifically, to automated generation of web API descriptions from usage data.

Conventional applications may require access to proprietary or large datasets, or computational functionalities. Some web services may provide access by providing such resources over the Internet. Service oriented computing standards were created to define various implementation aspects of web services. For example, Universal Description Discovery & Integration (UDDI) addresses service identifiability, the simple object access protocol (SOAP) prescribes how to implement service interfaces to enable interoperability, and the web service description language (WSDL) guarantees uniform, machine-readable service descriptions. Concepts like identifiability, interoperability, or composability may not be universally adopted by programmers, and thus, web application programming interfaces (web APIs) descriptions generally do not follow any one standard. Consequently most web services expose APIs having diverse conventions with descriptions may not be easily convertible from one standard to another.

Because structured web API description formats are not standardized and rapidly evolve with disparate programming and structural approaches, interpretation and description of API formats may be labor intense and cumbersome. For developers, this means documentation across APIs is not consistent and the potential for automated testing, consumption, or composition of services exposing web APIs is not currently leveraged.

SUMMARY

According to some embodiments, a method for installing an application on a mobile device is described. The method may include parsing an API usage dataset with a processor to identify a plurality of nodes in each of a plurality of uniform resource locators (URLs), and tagging path parameters for the plurality of nodes. Tagging the path parameters may include identifying, with the processor, which nodes are static parts of the URLs, and identifying, with the processor, which of the nodes are path parameters for the URLs. The method may further include aggregating, with the processor, a plurality of node types based on the tagged path parameters and the static parts of the URLs, and outputting, via the processor, an API description based on the aggregated plurality of node types.

According to other embodiments, a system for creating web programming an interface (API) description may include a processor configured to parse an API usage dataset with a processor to identify a plurality of nodes in each of a plurality of uniform resource locators (URLs). The system may be configured to tag path parameters for the plurality of nodes, where tagging includes identifying which of the nodes are static parts of the URLs, and identifying which of the nodes are path parameters for the URLs. The system may be further configured to aggregate the plurality of node types with the processor based on the tagged path parameters and the static parts of the URLs, and output an API description based on the aggregated plurality of node types.

According to other embodiments, a non-transitory computer-readable storage medium may be configured to store computer-executable instructions that, when executed by a computer, perform a method for creating a web programming interface (API) description. The method may include parsing an API usage dataset with a processor to identify a plurality of nodes in each of a plurality of uniform resource locators (URLs), and tagging path parameters for the plurality of nodes. Tagging the path parameters may include identifying, with the processor, which nodes are static parts of the URLs, and identifying, with the processor, which of the nodes are path parameters for the URLs. The method may further include aggregating, with the processor, a plurality of node types based on the tagged path parameters and the static parts of the URLs, and outputting, via the processor, an API description based on the aggregated plurality of node types.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 depicts an exemplary API description output based on aggregated node types, in accordance with an exemplary embodiment.

DETAILED DESCRIPTION

Figure 1:
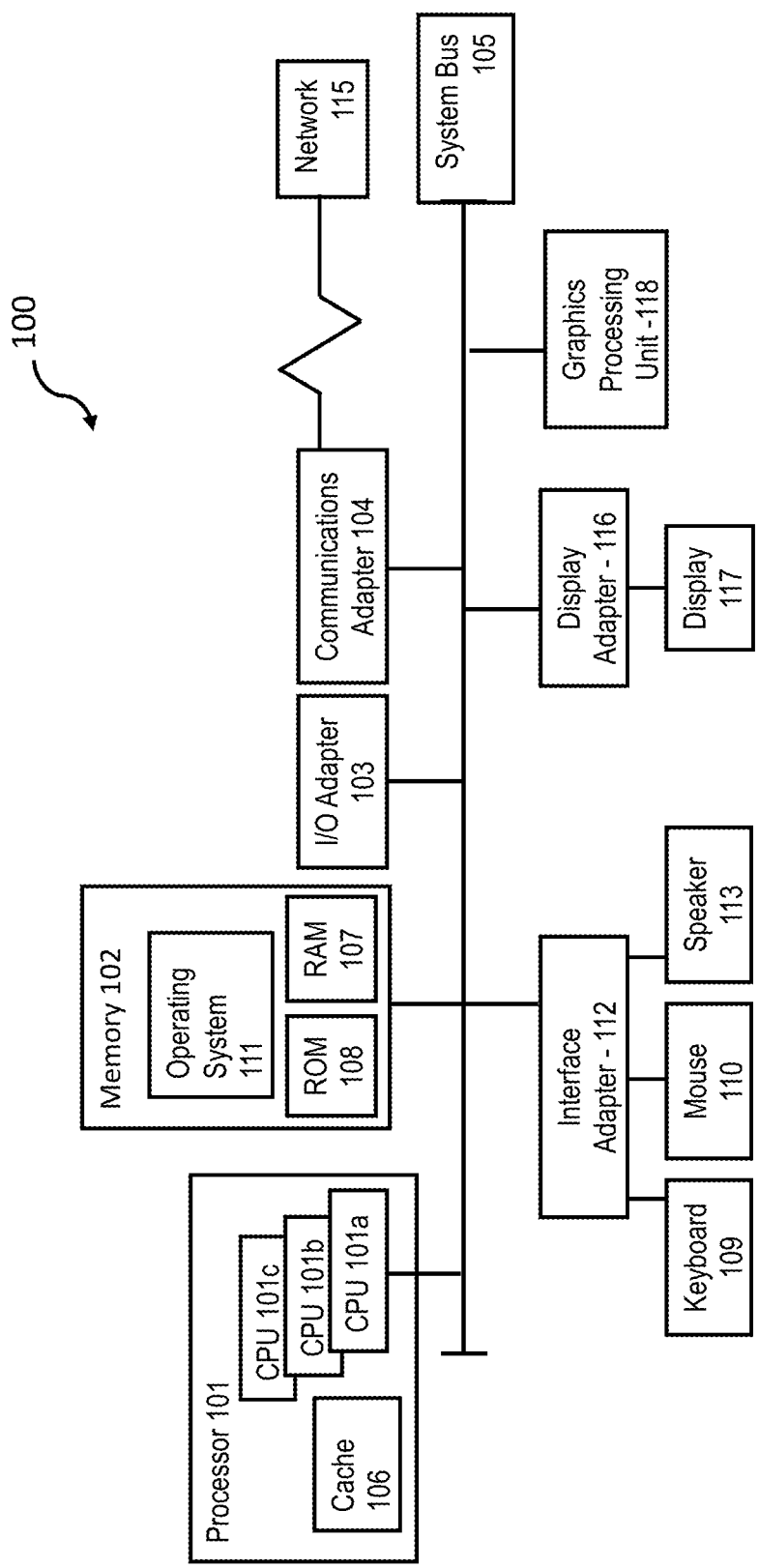
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices. Communications adaptor 104 may be operatively connect computer 100 to one or more networks 115. System bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.). According to some embodiments, processor may be configured to operate one or more application programming interface (API) description engines, such as, for example, API description engine 206 (shown with respect to FIG. 2).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
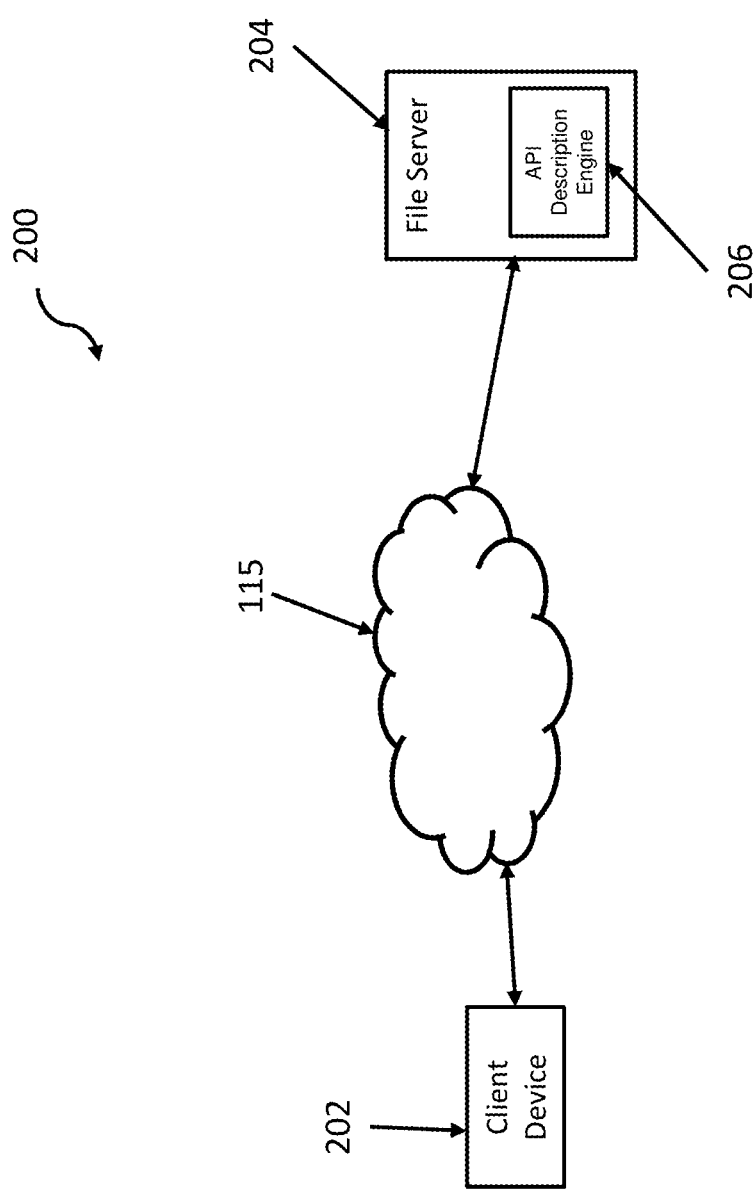
FIG. 2 depicts a computing environment for automated creation of a web programming interface (API) description in accordance with an exemplary embodiment.

Referring now to FIG. 2, an exemplary computing environment 200 for automated creation of an API description in accordance with an exemplary embodiment is provided. In some aspects, computing environment may include a client device 202 that may be in communication with one or more other devices, including, e.g., a file server 204. Client device 202 may communicate with file server 204 via network 115.

File server 204 may include an API description engine 206 (hereafter engine 206). API description engine 206 may be configured to perform embodiments described herein including, for example, receiving, saving and parsing an input data, processing the data, aggregating the data, and outputting API descriptions based on the processed input data. In some aspects engine 206 may be configured to operate on file server 204 via one or more processors. In other aspects, engine 206 may be configured to operate on client device 202.

Web API descriptions may define the set of possible interactions with web services. API descriptions are often written in machine-understandable languages such as XML or JSON. Standardized description formats may include, for example, Web Application Description Language (WADL), Swagger, and RESTful API Modeling Language (RAML). While the formats differ in the specific information they encode, some fundamental parts may be common to each of the exemplary description languages. In some aspects, web API descriptions may specify the resources exposed via hypertext transfer protocol (HTTP). Resources may sometime correspond to particular data elements, or may correspond to one or more specific functionalities. Resources may be identified with URLs, sometimes split between parts common to all of the resources (such as, for example, URL schemes, hosts, and/or base path), and may also be specific to the particular resource.

Web API descriptions may be a list of specific URLs, or alternatively, may provide a recipe for constructing URLs systematically from parameters. For instance, a service exposing a resource for each of its registered users could provide, using the Swagger format, an API description of the form:

```
{
    schemes : [ "https" ],
    host : "api.example.com",
    basePath : "/v1",
    paths : [
        "/user/{userIDg/profile" : { . . . }, . . .
    ]
}
```

Where the path element {userID} is a Swagger-specific notation for a path parameter, which may be indicative that several resources can be accessed by substituting appropriate values. In some aspects, resources may be refined by appending additional query parameters.

Query parameters may be passed as key-value pairs in the query string of the URL. For example, web API descriptions may define the set of supported keys and the expected types of values. Query parameters may typically be used for parameters that refine the resource in a non-hierarchical way (e.g., limiting the size of a resource), however this distinction is often ignored in practice. A service such as the one discussed above may expose its resources in a plurality of ways, two of which being:

https://api.example.com/v1/user/SMcDuck/profile, and
https://api.example.com/v1/profile?user=SMcDuck.

Individual API designers may often expose resources according to their mood or immediate need. In some cases, many APIs are left with inconsistencies between other APIs, depending on design choice of the API designer. It may be advantageous to provide systems and methods for automated creation of an API description from an API output dataset.

Figure 3:
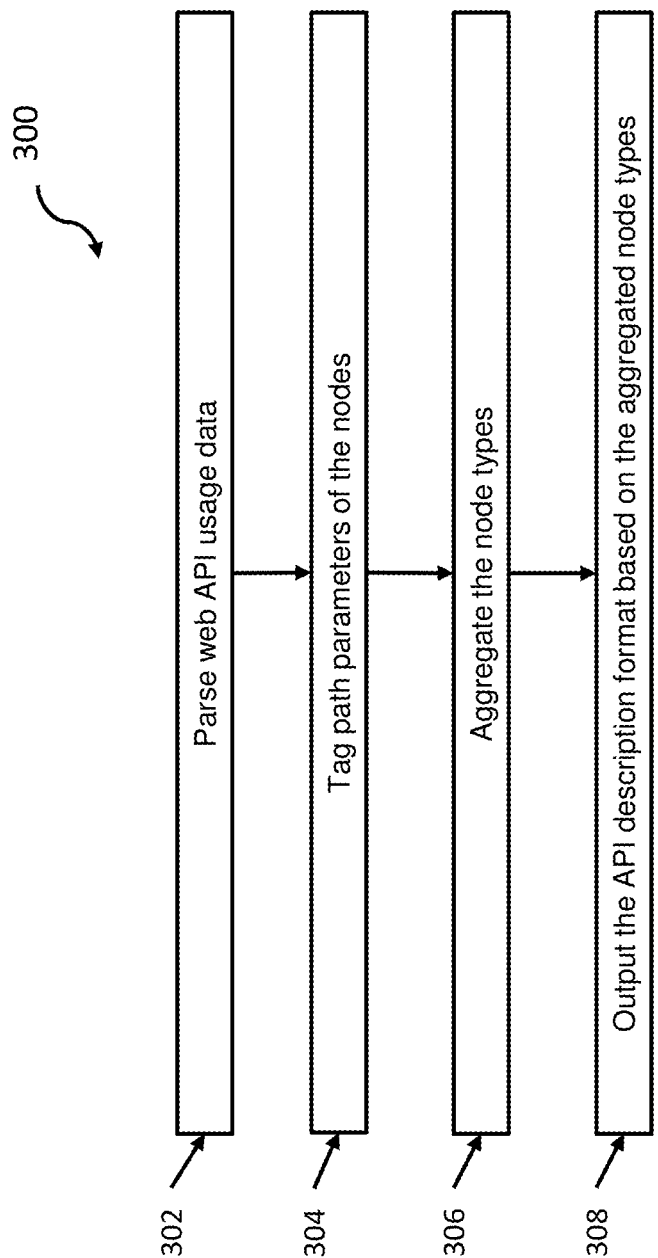
FIG. 3 depicts a flow diagram of a method for creating an API description in accordance with an exemplary embodiment.

Referring now to FIG. 3, a flow diagram 300 of a method for creating an API description in accordance with an exemplary embodiment is depicted. As shown at block 302, engine 206 may parse a web programming interface (API) usage data with a processor (e.g., processor 101) to identify a plurality of nodes in each of a plurality of URLs. In some aspects, API description engine 206 may receive a web API usage dataset derived from sets of usage data obtained by engine 206. Engine 206 may take a web API usage dataset as an input and output a web API description.

In some embodiments, engine 206 may input one or more server logs as datasets to be parsed by engine 206. For each HTTP request included in the server log, the logs may contain the HTTP method, headers, and/or response code. In some aspects, the server logs may or may not contain the request or response body.

Figure 4:
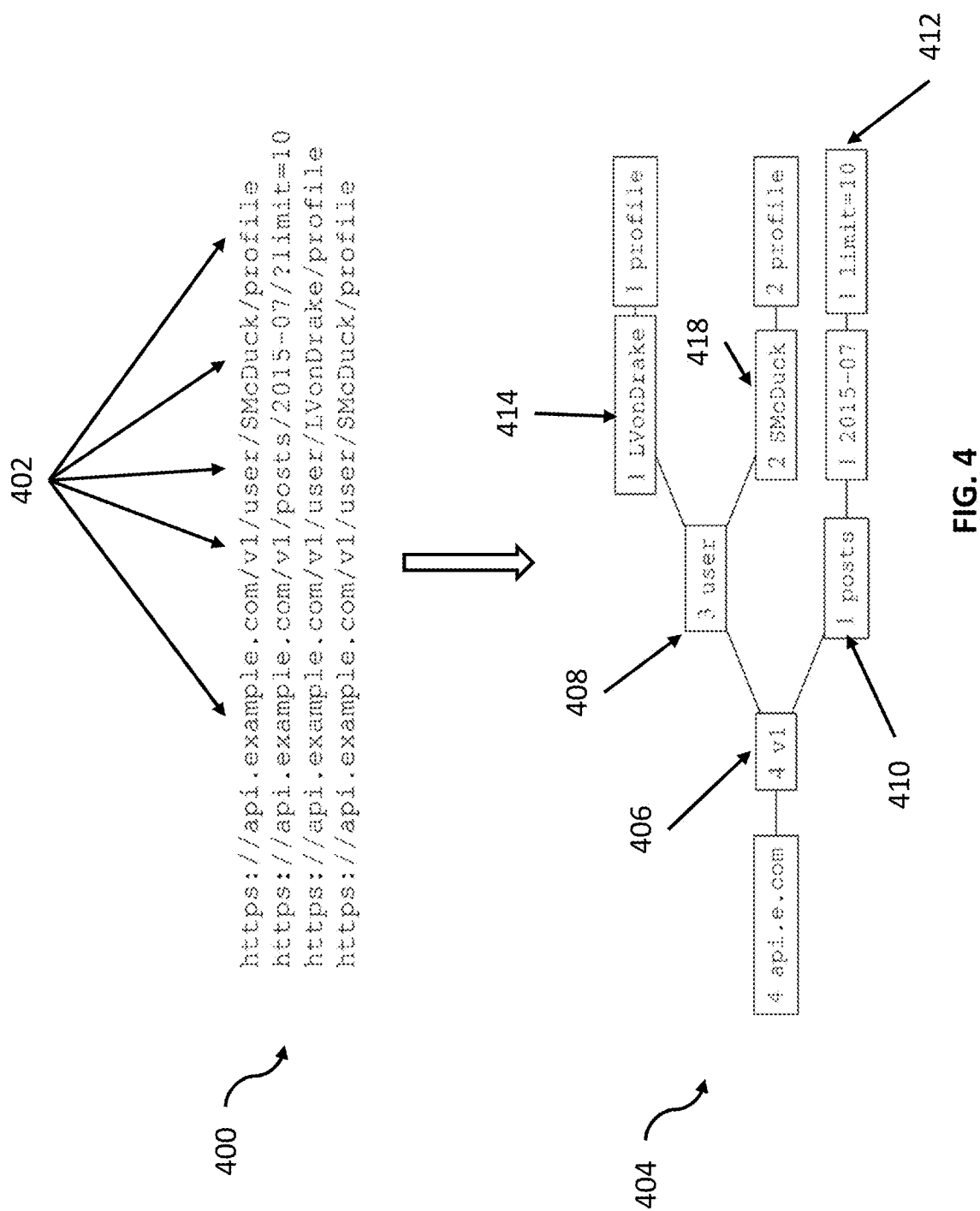
FIG. 4 depicts a flow diagram of a method for converting a uniform resource locator (URL) into a plurality of nodes organized in a tree structure in accordance with an exemplary embodiment.

As shown at block 302, engine 206 may parse each of the plurality of URLs and, for each URL, and separate the URL into a plurality of nodes. Accordingly, engine 206 may convert the plurality of nodes into a tree structure based on a prefix for each of the nodes, where nodes with common prefixes are represented as a node with a single path from a root. FIG. 4 depicts a plurality of URLs 400, each including a plurality of nodes 402.

Referring briefly to FIG. 4, a plurality of URLs 400 is depicted. Each URL may include URL portions depicted in FIG. 4 as a plurality of nodes 402. In some aspects, engine 206 may be configured to convert the plurality of nodes 402 for all of URLs 400 into a plurality of nodes 402 organized in a tree structure 404.

The first step in processing a set of URLs is to convert it into a tree representation. As an example, consider the following set of 4 URLs (depicted also in FIG. 4):

https://api.example.com/v1/user/S McDuck/profile,
https://api.example.com/v1/posts/2015-07/?limit=10,
https://api.example.com/v1/user/LVonDrake/profile, and
https://api.example.com/v1/user/S McDuck/profile.

A simplified version the above-noted URL nodes organized into a tree structure 404 is depicted in FIG. 4. Exemplary tree structure 404 may be rooted at the domain name via root 406, and branch off to encode different base paths (e.g., nodes 408 and 410). In some aspects, engine 206 may represent query parameter keys and values as leaf nodes (e.g., leaf node 412).

Besides the path or parameter information, each node may contain a count of the number of URLs sharing the prefix it represents. For example, node 408 recites, "3 user," which may be indicative that the node "user" appears in the plurality of URLs 400 a total of three times (e.g., three nodes contain "user"). In some embodiments, tree structures may additionally contain one or more labels indicative of which nodes are terminal, such as, for example, where they may correspond to fully formed URLs in the set. The labels, if available, may also include the corresponding HTTP method. In some embodiments, engine 206 may omit this information for simplicity (as depicted in FIG. 4), where the terminal and the leaf nodes may coincide.

When considering elements (nodes) of the URLs, a human API designer may look at the first URL above and determine that the node "SMcDuck" is obviously a username, and the node string "https://api.example.com/v1/user/" is a static data structure identifier that may show the schema of the URL. In some embodiments, engine 206 may automatically apply machine learning algorithms via classifiers to make a similar determination.

Referring again to FIG. 3, after parsing the web API as shown in block 302, engine 206 may tag path parameters for each of the plurality of nodes by identifying a node type for each of the plurality of nodes, as shown at block 304. In some aspects, engine 206 may retrieve information from tree structure 404 indicative of node types for each of the plurality of nodes. Engine 206 may tag path parameters for the nodes by determining whether each of the plurality of nodes is a query parameter node or a path parameter node and determine a data type for each of the plurality of nodes.

In some aspects, engine 206 may determine node types using a plurality of trained node binary classifiers that may logically infer data types based on observed information from the parsed URL nodes. In some aspects, for each recognized tag, engine 206 may create a classifier and train it with positive and negative examples for URL sets. For example, for some simple tags, such as "integer" or "Boolean" type tags, engine 206 may use regular expressions. By applying the trained set of node binary classifiers engine 206 may make all of the node tags uniform. Additionally, engine 206 may also produce correct matches for unforeseen data. For example, path parameter tags may not necessarily be mutually exclusive (e.g., the path parameter tags may not be data types "integer" and "numeric"). Because different web API description formats may support different data types, in some aspects engine 206 may train classifiers for a variety node tags, and, for each parameter, derive a type supported by the format from the set of all tags reported by the classifiers.

In some aspects, using a first trained classifier, engine 206 may identify a node type for a single path element, and determine whether it is more likely to be a fixed path or a path parameter. For instance, in the URL https://api.example.com/v1/user/SMcDuck/profile, engine 206 may determine that the path elements "v1", "user", and "profile" are fixed values, and that the value "SMcDuck" is the instantiation of a path parameter. Engine 206 may determine the node type for each of the plurality of nodes by considering a single path element at a time.

Features for the first classifier may include 1) individual character frequencies, 2) the length of the path element, 3) the index of the path element in the URL, and 4) the Shannon entropy of the character set. The intuition behind including the index is that path parameters may usually appear after certain common elements. In some embodiments, individual character frequency may be indicative of whether a word is a word in the English language, which may be indicative of whether the node is a parameter.

In some aspects, engine 206 may also include the Shannon entropy as a metric assessing the randomness of the characters in a path element. Entropy may include a probability of a particular character being repeated in one or more nodes. For example, for fixed URL paths, API designers typically pick simple English words or phrases, which may have low character entropy (that is, there are few repeat characters because the simple English word or phrase has few overall characters). Determining whether a node is an English word may be relevant because random or long identifiers (that are not English words but rather character strings). On the other hand, non-English language words may have high character entropy. When English words are included in a URL path, the English words may have a higher likelihood that they are part of the API schema.

Next, engine 206 may determine a length of the node element. In some instances, non-English terms can usually be longer than English words.

As a third aspect of the first classifier, engine 205 may determine a path index for the node. For example, considering FIG. 4 once again, engine 206 may use the index of the path element (the path node) to determine a probability of a particular node being a parameter. For example, with respect to tree structure 404, parameters LVonDrake 414 and SMcDuck 418 appear after base path 408, which is labeled as "3 user." Node 408 may be considered a base path because it a common node to three URLs (as indicated by recitation of the "3" in the label. Accordingly, engine 206 may determine an index of the path elements 414 and 418 as "parameters", based on index information learned by engine 206 using tree structure 404. The determination can be made based on the trained rule that path parameters usually appear after common components.

As previously explained, engine 206 may tag path parameters by identifying a node type for each of the plurality of nodes using two trained classifiers. In some aspects, engine 206 may decide, with the second classifier, whether set of sibling path nodes represent instantiations of a common path parameter for the set of sibling path nodes in the tree representation. Where engine 206 operated on each element individually using the first trained classifier, using the second trained classifier engine 206 may operate on the entire set of siblings at one time.

In some aspects, the features for this classifier may include 1) the fraction of nodes tagged as parameters by the first classifier, and 2) the entropy of the set of all characters in all nodes, 3) the entropy of the set of values, and 4) the entropy of the set of value lengths. The first feature indicative of the fraction of nodes may be a direct application of the previous classifier. In some embodiments, a high proportion may be indicative that the paths may merge into a path parameter (recalling that path parameters, e.g., nodes 414 and 418, often follow shared nodes e.g., base path node 408).

Features (2) and (4) may be configured to detect inconsistencies in formats between paths, which are sometimes uncommon in well-designed APIs, and thus, may be indicative that the element is a parameter. Feature (3) may discriminate between sets made of few, repeated values (which may be typical of an API structure), and larger, more varied sets (which may be indicative of a parameter). When engine 206 applies the second classifier and determines that siblings are likely to be instances of a path parameter, engine 206 may merge the subtrees, and perform the tagging operation described herein to determine which tags to apply to the newly created path parameter node.

Referring again to FIG. 3, after tagging path parameters of the nodes using the trained classifiers, as shown at block 304, at block 306 engine 206 may aggregate the node types and output the API description format based on the aggregated node types, as shown at block 308. FIG. 5 depicts an exemplary API description output based on aggregated node types in accordance with an exemplary embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for creating web application programing interface (API) descriptions, the system comprising:
 a processor configured to:
  parse a first API usage dataset, the first API usage dataset comprising a plurality of uniform resource locators (URLs) that were previously used to obtain services provided by a first web API, the parsing comprising identifying a plurality of nodes in each of the plurality of URLs;
  tag path parameters for the plurality of nodes using a first trained classifier operating on each node of the plurality of nodes individually and a second trained classifier operating on at least two of the nodes at one time, wherein the tagging comprises:
   identifying which of the nodes are static parts of the URLs; and
   identifying which of the nodes are path parameters for the URLs, the identifying which of the nodes are path parameters including determining, using the second trained classifier, that a set of sibling path nodes having different contents represent instantiations of a common path parameter;
aggregate a plurality of the plurality of nodes based on the tagged path parameters and the static parts of the URLs;
automatically create a first web API description based on the aggregated plurality of node, the first web API description defining a format for requesting the services from the first web API;
output the first web API description;
parse a second web API usage dataset having contents that were previously used to obtain services provided by a second web API that is different than the first web APL and
automatically create a second API description based on the second web API usage dataset, the second API description defining a format for requesting services provided by the second web API, wherein the format defined by the second API description is different than the format defined by the first API description.

2. The system of claim 1, wherein parsing the first web API comprises:
parsing each of the plurality of URLs and for each URL separating the URL into the plurality of nodes; and
converting the plurality of nodes into a tree structure based on a prefix for each of the nodes, wherein nodes with common prefixes are represented as a node with a single path from a root.

3. The system of claim 1, wherein tagging the path parameters further comprises identifying, with the processor, a data type for each of the path parameters.

4. The system of claim 3, wherein features of the first trained classifier comprise individual character frequencies in a node, a length of the node, an index of the node in the URL, and a Shannon entropy of a character set in the node.

5. The system of claim 4, wherein tagging the path parameters further comprises:
counting a character frequency for each unique character of the node;
determining a character length of the node;
determining an index of the node; and
determining an entropy of a set of value lengths based on the character frequency and the character length.

6. The system of claim 1, wherein the format of the first web API description is compliant with one of Swagger, RESTful API Modeling Language (RAIVIL), and API Blueprint, and the format of the second web API description is compliant with a different one of Swagger, RAML, and API Blueprint.

7. The system of claim 1, wherein features of the second trained classifier comprise a fraction of the nodes tagged as path parameters by the first classifier, the entropy of a set of all characters in all of the nodes, the entropy of a set of values of all of the nodes, and the entropy of a set of lengths of the values of all of the nodes.

8. A non-transitory computer-readable storage medium storing computer-executable instructions that, when executed by a computer, perform a method for creating web application programming interface (API) descriptions, the method comprising:
parsing a first API usage dataset, the first API usage dataset comprising a plurality of uniform resource locators (URLs) that were previously used to obtain services provided by a first web API, the parsing comprising identifying a plurality of nodes in each of the plurality of URLs;
tagging path parameters for the plurality of nodes using a first trained classifier operating on each node of the plurality of nodes individually and a second trained classifier operating on at least two of the nodes at one time, wherein the tagging comprises:
identifying, with the processor, which nodes are static parts of the URLs; and
identifying, with the processor, which of the nodes are path parameters for the URLs, the identifying which of the nodes are path parameters including determining, using the second trained classifier, that a set of sibling path nodes having different contents represent instantiations of a common path parameter;
aggregating a plurality of the plurality of nodes based on the tagged path parameters and the static parts of the URLs;
automatically creating a first web API description based on the aggregated plurality of nodes, the first web API description defining a format for requesting the services from the first web API; and
outputting the first web API description;
parsing a second web API usage dataset having contents that were previously used to obtain services provided by a second web API that is different than the first web API; and
automatically creating a second API description based on the second web API usage dataset, the second API description defining a format for requesting services provided by the second web API, wherein the format defined by the second API description is different than the format defined by the first API description.

9. The non-transitory computer-readable medium of claim 8, wherein parsing the first web API comprises:
parsing each of the plurality of URLs and for each URL separating the URL into the plurality of nodes; and
converting the plurality of nodes into a tree structure based on a prefix for each of the nodes, wherein nodes with common prefixes are represented as a node with a single path from a root.

10. The non-transitory computer-readable medium of claim 8, wherein tagging the path parameters further comprises identifying, with the processor, a data type for each of the path parameters.

11. The non-transitory computer-readable medium of claim 10, wherein features of the first trained classifier comprise individual character frequencies in a node, a length of the node, an index of the node in the URL, and a Shannon entropy of a character set in the node.

12. The non-transitory computer-readable medium of claim 11, wherein tagging the path parameters further comprises:
counting a character frequency for each unique character of the node;
determining a character length of the node;
determining an index of the node; and
determining an entropy of a set of value lengths based on the character frequency and the character length.

13. The non-transitory computer-readable medium of claim 8, wherein the format of the first web API description is compliant with one of Swagger, RESTful API Modeling Language (RAML), and API Blueprint, and the format of the second web API description is compliant with a different one of Swagger, RAML, and API Blueprint.

14. The non-transitory computer-readable medium of claim 8, wherein features of the second trained classifier comprise a fraction of the nodes tagged as path parameters by the first classifier, the entropy of a set of all characters in all of the nodes, the entropy of a set of values of all of the nodes, and the entropy of a set of lengths of the values of all of the nodes.

* * * * *